(12) United States Patent
Liu et al.

(10) Patent No.: US 12,515,240 B2
(45) Date of Patent: Jan. 6, 2026

(54) SEGMENTED GETTER OPENINGS FOR MICROMACHINED ULTRASOUND TRANSDUCER DEVICES

(71) Applicant: BFLY OPERATIONS, INC., Burlington, MA (US)

(72) Inventors: Jianwei Liu, Fremont, CA (US); Lingyun Miao, Fremont, CA (US)

(73) Assignee: BFLY OPERATIONS, INC.

( * ) Notice: Subject to any disclaimer, the term of this patent is extended or adjusted under 35 U.S.C. 154(b) by 916 days.

(21) Appl. No.: 16/844,837

(22) Filed: Apr. 9, 2020

(65) Prior Publication Data

US 2020/0324318 A1 Oct. 15, 2020

Related U.S. Application Data

(60) Provisional application No. 62/874,464, filed on Jul. 15, 2019, provisional application No. 62/833,625, filed on Apr. 12, 2019.

(51) Int. Cl.
*B06B 1/02* (2006.01)
*B81B 7/00* (2006.01)
(Continued)

(52) U.S. Cl.
CPC .......... *B06B 1/0292* (2013.01); *B81B 7/0038* (2013.01); *B81C 1/00285* (2013.01);
(Continued)

(58) Field of Classification Search
USPC ......................................................... 310/309
IPC .......... G01N 29/2406,2291/106; B06B 1/0292, 1/0622, 2201/76; B81C 1/00285, 2203/036; B81B 7/0038, 2203/04,
(Continued)

(56) References Cited

U.S. PATENT DOCUMENTS

| 6,430,109 B1 | 8/2002 | Khuri-Yakub et al. |
| 6,694,817 B2 | 2/2004 | Degertekin et al. |

(Continued)

FOREIGN PATENT DOCUMENTS

| CN | 104837096 A | 8/2015 |
| CN | 106211005 A | 12/2016 |

(Continued)

OTHER PUBLICATIONS

International Search Report and Written Opinion mailed Jul. 13, 2020 in connection with International Application No. PCT/US2020/027437.

(Continued)

*Primary Examiner* — Nathan W Ha
(74) *Attorney, Agent, or Firm* — Boston & Galway, LLC

(57) ABSTRACT

An ultrasonic transducer device includes a bottom electrode layer of a transducer cavity disposed over a substrate, and a plurality of vias that electrically connect the bottom electrode layer with the substrate. A bottom cavity layer is disposed over the bottom electrode layer, and one or more openings are formed in the bottom cavity layer so as to expose a region of the bottom electrode layer, wherein locations of the one or more openings are segments that are disposed proximate an outer perimeter of the transducer cavity and substantially correspond to locations where the plurality of vias are not disposed directly beneath.

9 Claims, 14 Drawing Sheets

(51) Int. Cl.
*B81C 1/00* (2006.01)
*G01N 29/24* (2006.01)
*A61B 8/00* (2006.01)
*A61N 7/00* (2006.01)

(52) U.S. Cl.
CPC ........ *G01N 29/2406* (2013.01); *A61B 8/4494* (2013.01); *A61N 7/00* (2013.01); *B06B 2201/76* (2013.01); *B81B 2201/0271* (2013.01); *B81B 2203/0127* (2013.01); *B81B 2203/0315* (2013.01); *B81B 2203/04* (2013.01); *B81C 2203/036* (2013.01)

(58) Field of Classification Search
IPC ................. 2201/0271, 2203/0315, 2203/0127; A61N 7/00, 2007/0078
See application file for complete search history.

(56) References Cited

U.S. PATENT DOCUMENTS

| | | | |
|---|---|---|---|
| 6,779,387 | B2 | 8/2004 | Degertekin |
| 6,958,255 | B2 | 10/2005 | Khuri-Yakub et al. |
| 7,615,834 | B2 | 11/2009 | Khuri-Yakub et al. |
| 7,846,102 | B2 | 12/2010 | Kupnik et al. |
| 8,241,931 | B1 | 8/2012 | Antoine et al. |
| 8,402,831 | B2 | 3/2013 | Kupnik et al. |
| 9,067,779 | B1 | 6/2015 | Rothberg et al. |
| 9,143,868 | B2 | 9/2015 | Pinkerton et al. |
| 9,242,275 | B2 | 1/2016 | Rothberg et al. |
| 9,319,800 | B2 | 4/2016 | Hong et al. |
| 9,499,392 | B2 | 11/2016 | Rothberg et al. |
| 9,505,030 | B2 | 11/2016 | Rothberg et al. |
| 9,533,873 | B2 | 1/2017 | Rothberg et al. |
| 9,938,134 | B2 | 4/2018 | Lin et al. |
| 2004/0141421 | A1 | 7/2004 | Cheng et al. |
| 2007/0215964 | A1 | 9/2007 | Khuri-Yakub et al. |
| 2009/0085205 | A1 | 4/2009 | Sugizaki |
| 2009/0140609 | A1 | 6/2009 | Huang |
| 2010/0225200 | A1 | 9/2010 | Kupnik et al. |
| 2010/0327380 | A1* | 12/2010 | Chang ................. B81C 1/00476 257/419 |
| 2011/0018398 | A1 | 1/2011 | Fukuda |
| 2011/0050045 | A1 | 3/2011 | Aratake et al. |
| 2011/0055447 | A1 | 3/2011 | Costa |
| 2011/0115333 | A1 | 5/2011 | Ezaki |
| 2013/0135056 | A1 | 5/2013 | Allegato et al. |
| 2014/0264660 | A1 | 9/2014 | Rothberg et al. |
| 2015/0032002 | A1 | 1/2015 | Rothberg et al. |
| 2016/0009544 | A1 | 1/2016 | Rothberg et al. |
| 2016/0043660 | A1 | 2/2016 | Wang et al. |
| 2017/0232474 | A1 | 8/2017 | Oralkan et al. |
| 2017/0297904 | A1 | 10/2017 | Lin et al. |
| 2018/0243792 | A1 | 8/2018 | Rothberg et al. |
| 2018/0333136 | A1 | 11/2018 | Michalski et al. |
| 2018/0369862 | A1 | 12/2018 | Alie et al. |
| 2018/0376253 | A1 | 12/2018 | Lutsky et al. |
| 2019/0047850 | A1 | 2/2019 | Rothberg et al. |
| 2019/0142387 | A1 | 5/2019 | Chen et al. |
| 2019/0160490 | A1 | 5/2019 | Alie et al. |
| 2019/0231312 | A1 | 8/2019 | Fife et al. |
| 2019/0261954 | A1 | 8/2019 | Chen et al. |
| 2019/0261955 | A1 | 8/2019 | Chen et al. |
| 2019/0275561 | A1 | 9/2019 | Fife et al. |
| 2019/0336099 | A1 | 11/2019 | Fife et al. |
| 2019/0336103 | A1 | 11/2019 | Fife et al. |
| 2019/0336104 | A1 | 11/2019 | Fife et al. |
| 2020/0013691 | A1 | 1/2020 | Liu et al. |
| 2020/0102214 | A1 | 4/2020 | Liu et al. |
| 2020/0324319 | A1 | 10/2020 | Miao et al. |

FOREIGN PATENT DOCUMENTS

| | | |
|---|---|---|
| EP | 2274108 A1 | 1/2011 |
| EP | 2509125 A2 | 10/2012 |
| EP | 2907588 A2 | 8/2015 |
| JP | 2005-235452 A | 9/2005 |
| WO | 2009133961 A1 | 11/2009 |
| WO | WO 2013/049794 A1 | 4/2013 |
| WO | WO 2016/011000 | 1/2016 |

OTHER PUBLICATIONS

International Search Report and Written Opinion mailed Jul. 13, 2020 in connection with International Application No. PCT/US2020/027457.
International Preliminary Report on Patentability mailed Oct. 21, 2021 in connection with International Application No. PCT/US2020/027457.
K. Midtbø et al, "High-frequency CMUT Arrays with Phase-steering for in vivo Ultrasound Imaging," 2013 IEEE Sensors, pp. 1-5, XP 032308863, ISSN: 1930-0395, DOI: 10.1109/ICSENS.2012.6411413, dated Oct. 28, 2012 (15 pages).
Extended European Search Report issued in corresponding European Application No. 20786948.8; dated Nov. 18, 2022 (5 pages).
Office Action issued in Chinese Application No. 202080037126.X; Dated Oct. 26, 2022 (7 pages).
International Search Report and Written Opinion mailed Dec. 16, 2019 in connection with International Application No. PCT/US2019/053352.
International Preliminary Report on Patentability mailed Apr. 8, 2021 in connection with International Application No. PCT/Us2019/053352.
Daft et al., Microfabricated ultrasonic transducers monolithically integrated with high voltage electronics. Proc Ultrason Symp. 2004;493-6.
Kupnik et al., CMUT Fabrication Based on a Thick Buried Oxide Layer. Proc IEEE Ultrason Symp. Oct. 2010;2010:547-550. doi:10.1109/ULTSYM.2010.5935935. Epub Jun. 8, 2012. 10 pages.
Kupnik et al., Wafer-Bonded CMUT Meets CMOS. 2010 CMOS Emerging Technology Workshop. May 21, 2010;1-22.
Gurun et al., Front-end CMOS Electronics for Monolithic Integration with CMUT Arrays: Circuit Design and Initial Experimental Results. IEEE International Ultrasonics Symposium Proceedings. 2008:390-3.
U.S. Appl. No. 16/844,857, filed Apr. 9, 2020, Miao.
U.S. Appl. No. 16/585,283, filed Sep. 27, 2019, Liu et al..
PCT/US2019/053352, Dec. 16, 2019, International Search Report and Written Opinion.
PCT/US2019/053352, Apr. 8, 2021, International Preliminary Report on Patentability.
PCT/US2020/027457, Jul. 13, 2020, International Search Report and Written Opinion.
PCT/US2020/027437, Jul. 13, 2020, International Search Report and Written Opinion.

* cited by examiner

SEGMENTED GETTER OPENINGS FOR MICROMACHINED ULTRASOUND TRANSDUCER DEVICES

CROSS-REFERENCE TO RELATED APPLICATIONS

The present application claims the benefit under 35 U.S.C. § 119(e) of U.S. Provisional Application Ser. No. 62/874,464 filed on Jul. 15, 2019, and entitled "BOTTOM ELECTRODE VIA STRUCTURES FOR MICROMACHINED ULTRASONIC TRANSDUCER DEVICES," which is hereby incorporated herein by reference in its entirety.

The present application claims the benefit under 35 U.S.C. § 119(e) of U.S. Provisional Application Ser. No. 62/833,625 filed on Apr. 12, 2019, and entitled "BOTTOM ELECTRODE VIA STRUCTURES FOR MICROMACHINED ULTRASONIC TRANSDUCER DEVICES," which is hereby incorporated herein by reference in its entirety.

BACKGROUND

The present disclosure relates generally to micromachined ultrasonic transducers and, more specifically, to bottom electrode via structures for micromachined ultrasonic transducer cavities.

Ultrasound devices may be used to perform diagnostic imaging and/or treatment, using sound waves with frequencies that are higher than those audible to humans. When pulses of ultrasound are transmitted into tissue, sound waves are reflected off the tissue with different tissues reflecting varying degrees of sound. These reflected sound waves may then be recorded and displayed as an ultrasound image to the operator. The strength (amplitude) of the sound signal and the time it takes for the wave to travel through the body provide information used to produce the ultrasound images.

Some ultrasound imaging devices may be fabricated using micromachined ultrasonic transducers, including a flexible membrane suspended above a substrate. A cavity is located between part of the substrate and the membrane, such that the combination of the substrate, cavity and membrane form a variable capacitor. When actuated by an appropriate electrical signal, the membrane generates an ultrasound signal by vibration. In response to receiving an ultrasound signal, the membrane is caused to vibrate and, as a result, generates an output electrical signal.

SUMMARY

In one aspect, an ultrasonic transducer device includes a bottom electrode layer of a transducer cavity disposed over a substrate, and a plurality of vertical interconnect accesses (vias) that electrically connect the bottom electrode layer with the substrate. A bottom cavity layer is disposed over the bottom electrode layer, and one or more openings are formed in the bottom cavity layer so as to expose a region of the bottom electrode layer, wherein locations of the one or more openings substantially correspond to locations where the plurality of vias are not disposed directly beneath.

In another aspect, an ultrasonic transducer device includes a bottom electrode layer of a transducer cavity disposed over a substrate; a plurality of vias that electrically connect the bottom electrode layer with the substrate; a bottom cavity layer disposed over the bottom electrode layer; and one or more openings formed in the bottom cavity layer so as to expose a region of the bottom electrode layer. The plurality of vias are disposed in locations directly beneath a footprint of the transducer cavity, the locations also being offset from directly beneath a footprint of the one or more openings.

In another aspect, an ultrasonic transducer device includes a bottom electrode layer of a transducer cavity disposed over a substrate. The bottom electrode layer includes a first portion that serves as a transducer bottom electrode and a second portion that serves as a bypass metal structure, the bypass metal structure electrically isolated from the transducer bottom electrode. A bottom cavity layer disposed over the bottom electrode layer, and a plurality of openings is formed in the bottom cavity layer so as to expose regions of the bypass metal structure. The plurality of openings include segments disposed proximate an outer perimeter of the transducer cavity, the segments being spaced apart from one another about the outer perimeter of the transducer cavity. A transducer membrane seals the transducer cavity, wherein the exposed regions of the bypass metal structure serve as a getter material to consume one or more gaseous materials present in the transducer cavity during bonding of the transducer membrane.

BRIEF DESCRIPTION OF THE DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

FIGS. 5-1 through 5-12 are a series of cross-sectional views illustrating a process that may be used to form the transducer device of FIG. 2.

FIG. 6 is a plan view of a portion of a transducer array at a point in processing corresponding to FIG. 5-11 or FIG. 5-12, illustrating an exemplary getter opening pattern.

FIG. 7 is a plan view of a portion of a transducer array illustrating a segmented getter opening pattern, in accordance with an embodiment.

FIG. 9 is a top view of an example ultrasonic transducer device that may be formed using the getter opening pattern of FIG. 7.

FIG. 10 is a plan view of a portion of a hexagonal shaped transducer illustrating a continuous, annular getter opening pattern.

FIG. 11 is a plan view of a portion of a hexagonal shaped transducer illustrating a segmented getter opening pattern, in accordance with an embodiment.

DETAILED DESCRIPTION

The techniques and structures described herein relate to metallic getter opening patterns used during cavity bonding operations in the manufacturing of micromachined ultrasonic transducer (MUT) cavities. In one aspect, a segmented getter opening pattern provides the same or substantially similar gettering benefits with respect to a fully annular getter opening pattern, and with at least an additional advantage of ensuring good electrical conductivity of the bypass capacitor electrodes even in the event that if the getter opening dry etching process is over-etched. This in turn may provide improved process margin, which is desired for large volume manufacturing of MUT devices.

One type of transducer suitable for use in ultrasound imaging devices is a MUT, which can be fabricated from, for example, silicon and configured to transmit and receive ultrasound energy. MUTs may include capacitive micromachined ultrasonic transducers (CMUTs) and piezoelectric micromachined ultrasonic transducers (PMUTs), both of which can offer several advantages over more conventional transducer designs such as, for example, lower manufacturing costs and fabrication times and/or increased frequency bandwidth. With respect to the CMUT device, the basic structure is a parallel plate capacitor with a rigid bottom electrode and a top electrode residing on or within a flexible membrane. Thus, a cavity is defined between the bottom and top electrodes. In some designs (such as those produced by the assignee of the present application for example), a CMUT may be directly integrated on an integrated circuit that controls the operation of the transducer. One way of manufacturing a CMUT is to bond a membrane substrate to an integrated circuit substrate, such as a complementary metal oxide semiconductor (CMOS) substrate. This may be performed at temperatures sufficiently low to prevent damage to the devices of the integrated circuit.

Figure 1:
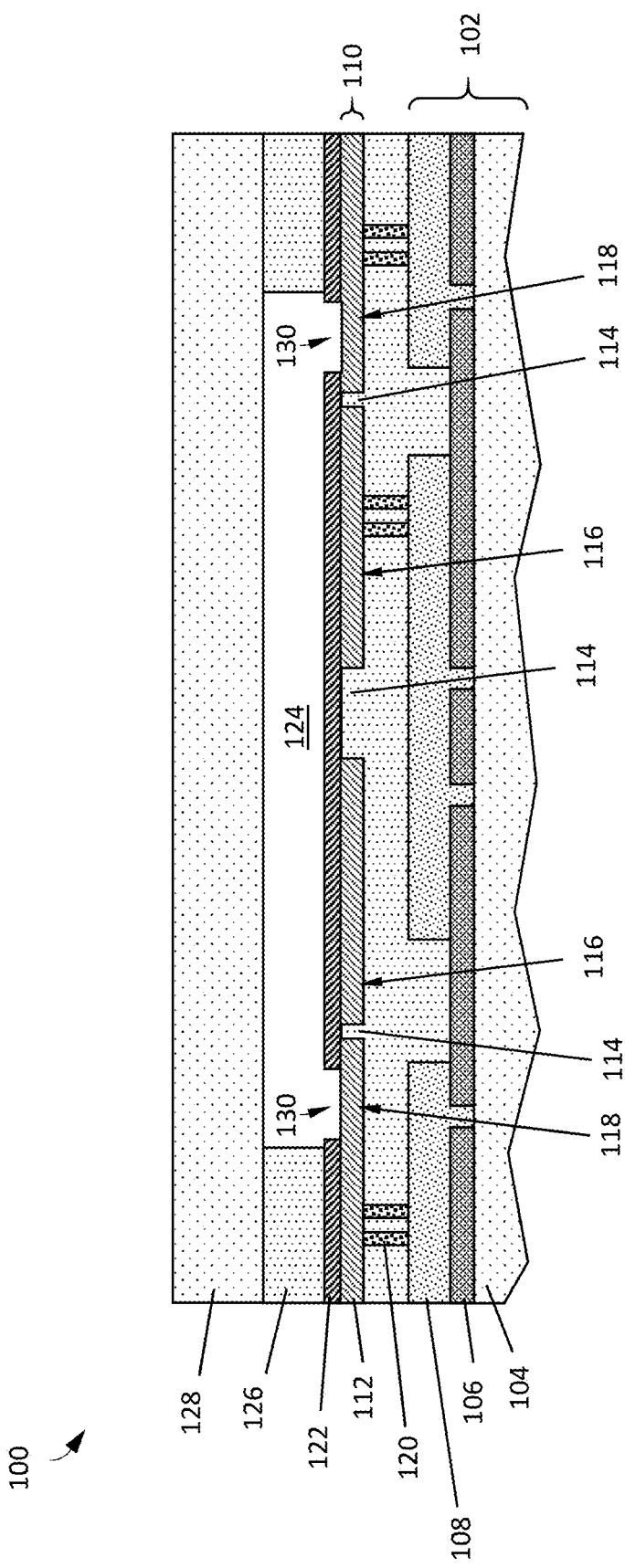
FIG. 1 is a cross-sectional view of an exemplary micromachined ultrasonic transducer device.

Referring initially to FIG. 1, there is shown a cross-sectional view of an exemplary micromachined ultrasonic transducer device 100, such as a CMUT. The transducer device 100 includes a substrate, generally designated by 102, (e.g., a CMOS substrate, such as silicon) having one or more layers, such as for example: CMOS integrated circuits and wiring layers (at or below region 104), one more insulation/passivation layers 106, and one or more wiring redistribution layers 108. A transducer bottom electrode layer, designated generally at 110, is disposed over the substrate 102 and includes patterned regions of a metal layer 112 (e.g., titanium (Ti)), between which are located regions of an insulation layer 114 (e.g., silicon oxide ($SiO_2$)). In the illustrated example, first portions of the patterned metal layer 112 may serve as a transducer bottom electrode 116 (e.g., in a "donut" or ring configuration), while second portions of the patterned metal layer 112 may serve another function (e.g., a bypass metal structure 118). As specific substrate and transducer bottom electrode patterns are not the focus of the present disclosure, only a single example is presented in the figures. It will be appreciated, however, that the present embodiments may also be implemented in conjunction with several other transducer electrode structures including (but not limited to), for example: the aforementioned donut shaped electrode pattern (e.g., interior metal removed), multiple segment or ring electrodes, and additional metal patterns used for other purposes besides bottom electrodes (e.g., cavity getter during bonding).

Still referring to FIG. 1, electrically conductive vias 120 (e.g., tungsten (W)) electrically connect the one or more wiring redistribution layers 108 to the patterned metal layer 112 of the transducer bottom electrode layer 110. The formation and specific locations of such vias 120 is discussed in further detail below. A bottom cavity layer 122 is disposed over the transducer bottom electrode layer 110. The bottom cavity layer 122 may include, for example, an electrically insulating, thin film layer stack including an $SiO_2$ layer deposited by chemical vapor deposition (CVD) and an aluminum oxide ($Al_2O_3$) layer deposited by atomic layer deposition (ALD). A transducer cavity 124 is defined by lithographic patterning and etching of a membrane support layer 126 that is formed on the bottom cavity layer 122. The membrane support layer 126 may be an insulating layer, such as $SiO_2$ for example, the remaining portions of which provide a support surface to which a flexible transducer membrane 128 (e.g., highly doped silicon at a concentration of about $1 \times 10^{18}$ atoms/cm$^3$ to about $1 \times 10^{19}$ atoms/cm$^3$) is bonded. In order to preserve the integrity and functionality of the various CMOS devices residing within the substrate 102 (such as CMOS circuits and wiring layers at or below region 104), a relatively low temperature bonding process (e.g., less than about 450° C.) is employed for bonding the transducer membrane 128 to the membrane support layer 126.

However, during bonding of the membrane substrate to the CMOS substrate, there may be a difference in cavity pressures across the die and wafer due to the water vapor and other gaseous byproducts and the propagation of the bond. This in turn may result in undesired variability of certain CMUT-based operating parameters such as for example, collapse voltage, as well as transmit/receive pressure sensitivity. Accordingly, it is desirable to be able to control cavity pressure within such a transducer device during the manufacturing process, as well as over the lifetime of the device. Thus, as additionally illustrated in FIG. 1, a getter opening pattern 130 is defined (e.g., by etching) in the bottom cavity layer 122 prior to membrane bonding so as to expose a portion of the bypass metal structure 118 proximate the outer perimeter of the transducer cavity 124. In one example (and as discussed in further detail below), the getter opening pattern 130 may be an annular or ring-shaped pattern etched into the bottom cavity layer 122 prior to bonding of the transducer membrane 128. By exposing the metal material of the bypass metal structure 118, gaseous material present in the cavity region (e.g., oxygen, nitrogen, argon, water vapor, etc.) may be consumed by the metal, resulting in a more uniform pressure across the various cavities 120 of the ultrasound device. Additional information regarding cavity gettering may be found in co-pending U.S. Patent Application Ser. No. 62/738,502, filed Sep. 28, 2018 and U.S. Patent Application Ser. No. 62/830,325, filed Apr. 5, 2019, both assigned to the assignee of the present application, and the contents of which are incorporated by reference herein in their entirety.

In addition to maintaining desirable cavity pressures during bonding of the membrane substrate to the CMOS substrate, it is further desirable to have a smooth bonding interface between the bonded surfaces. In the example described, the bonding interface is represented by the top surface of the membrane support layer 126 and the bottom surface of the transducer membrane 128. Such an interface desirably has a surface roughness of less than about 1 nm over a range of about 100 μm. During the manufacturing of structures such as the exemplary transducer device 100, chemical mechanical polishing (CMP) may be used to planarize certain structures such as the metal layer 112, the insulation layer 114, and the material (e.g., W) of the vias 120 in order to provide a smooth bonding interface for downstream steps.

However, certain fabrication steps may introduce surface planarization difficulties resulting from individual vias being in relatively close proximity to one another. For example, dishing caused by erosion or protrusion caused by oxide buffering may occur if the CMP process is not well controlled or experiences variations/fluctuations. Any such surface planarization problems can in turn affect downstream layer formation planarity and ultimately negatively impact the transducer membrane bonding integrity. In the former case, dishing may result in the top surface of the insulating layer 114 being recessed below an ideal horizontal plane, in the vicinity of the vias 120. In the latter case, oxide buffering might cause the vias 120 and portions of the insulation layer 114 (e.g., oxide) between the vias 120, to extend above remaining upper surfaces of the insulation layer 114.

One way to reduce the impact of (and/or eliminate altogether) via planarization operations in the formation of micromachined ultrasonic transducer devices may be to pattern and locate of the vias connecting the CMOS wiring redistribution layers to the transducer bottom electrode layer so as to be primarily confined below a cavity footprint of the transducers. An example of this approach is illustrated in conjunction with the micromachined ultrasonic transducer device 200 shown in FIG. 2 (where like elements are designated with like reference numbers). As will be noted by a comparison of FIG. 1 with FIG. 2, the outermost sets of vias 120 shown in FIG. 1 have been relocated in FIG. 2 so as to be disposed directly beneath a footprint 202 of the transducer cavity 124. This is the case for via connection to both the transducer bottom electrode structures 116 and the bypass metal structures 118 of the metal layer 112. That is, the regions 204 beyond the footprint 202 of the transducer cavity 124 do not have any of the vias 120 disposed directly below. In this manner, any difficulties associated with the formation of the vias (in terms of surface planarity as discussed above) may have little to no impact on the surface planarity of the membrane support layer 126 (i.e., the membrane bonding regions). This distinction in via location between the device of FIG. 2 with the device of FIG. 1 is may be further illustrated by reference to a side-by-side comparison of FIG. 3 and FIG. 4.

Figure 4:
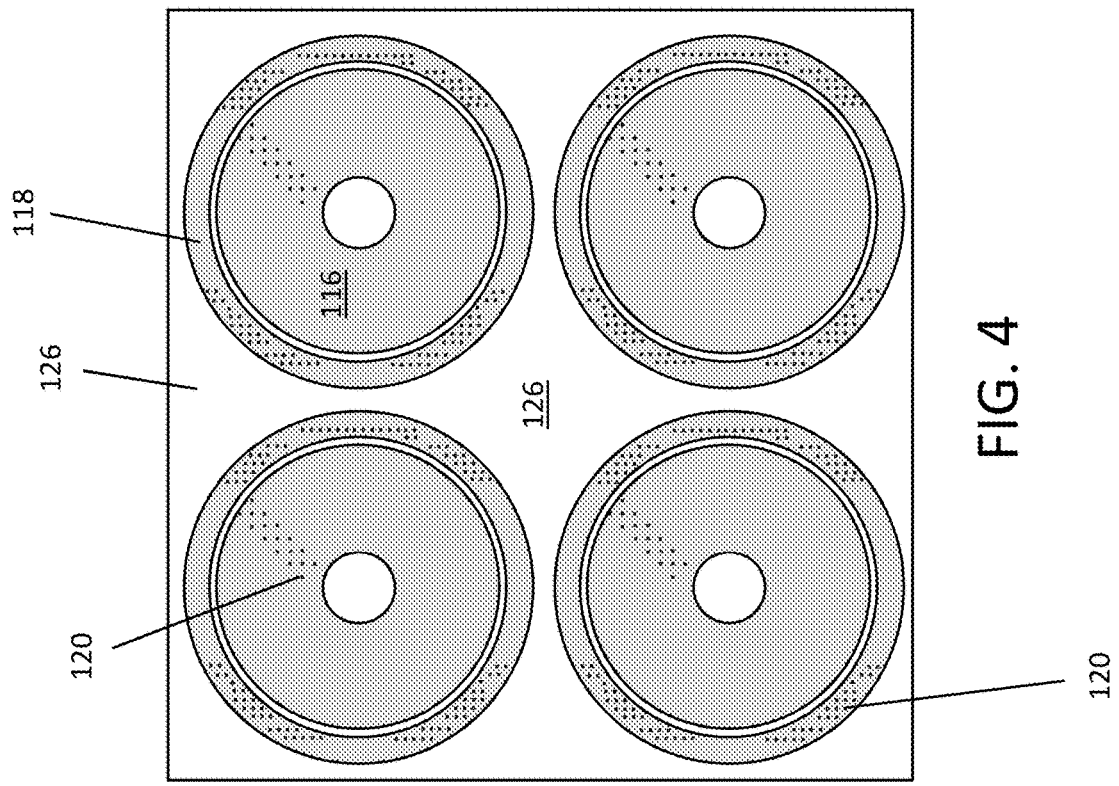
FIG. 4 is a plan view of a portion of a transducer array illustrating exemplary via locations for transducers formed in accordance with FIG. 2.
Figure 3:
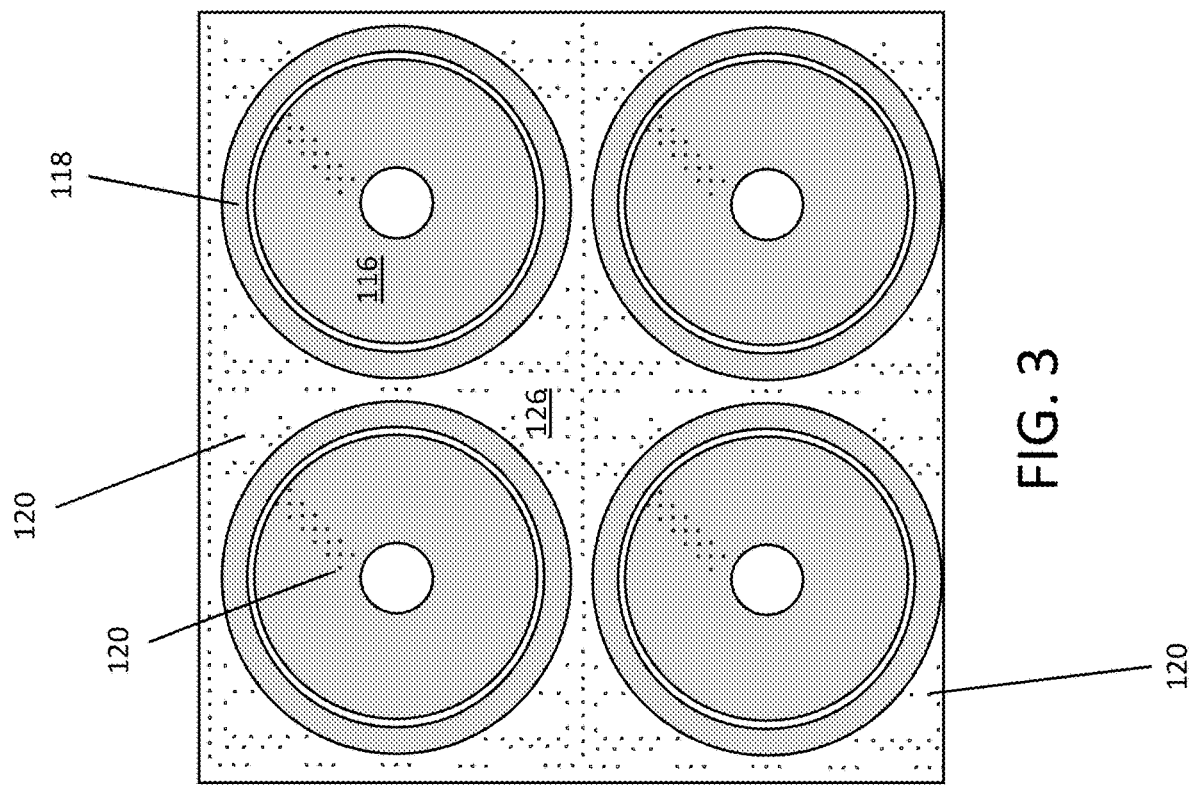
FIG. 3 is a plan view of a portion of a transducer array illustrating exemplary via locations for transducers formed in accordance with FIG. 1.

Both FIG. 3 and FIG. 4 illustrate a plan view of a portion of a transducer array (4×4 in this particular example) illustrating exemplary via locations for transducers. The vias 120 in each figure are relatively small compared to other features and therefore appear as dots. As will be noted from FIG. 3, which corresponds to the structure of FIG. 1, the vias 120 are present both below the transducer cavity footprint (denoted by the darker shaded circular regions), as well as below the bonding regions corresponding to the patterned membrane support layer 126. That is, the vias 120 in FIG. 3 are used to make an electrical connection to the transducer bottom electrode structures 116 below the cavity footprint, as well as to the bypass metal structures 118 beyond the cavity footprint (i.e., beneath the membrane support layer 126).

In contrast, FIG. 4 illustrates that each of the vias 120 that connect to the transducer bottom electrode structures 116 or to the bypass metal structures 118 are located directly beneath the cavity footprint. That is, the regions directly beneath the membrane support layer 126 are free from (or substantially free from) having vias located therein. As a result, in the event where CMP processing variations exist, such a via location scheme may minimize any process impact to the bonding field regions. Additional information regarding providing smooth bonding interfaces for micromachined ultrasonic transducer devices may be found in U.S. Patent Application Ser. No. 62/833,625, filed Apr. 12, 2019, assigned to the assignee of the present application, and the contents of which are incorporated by reference herein in their entirety.

Figure 2:
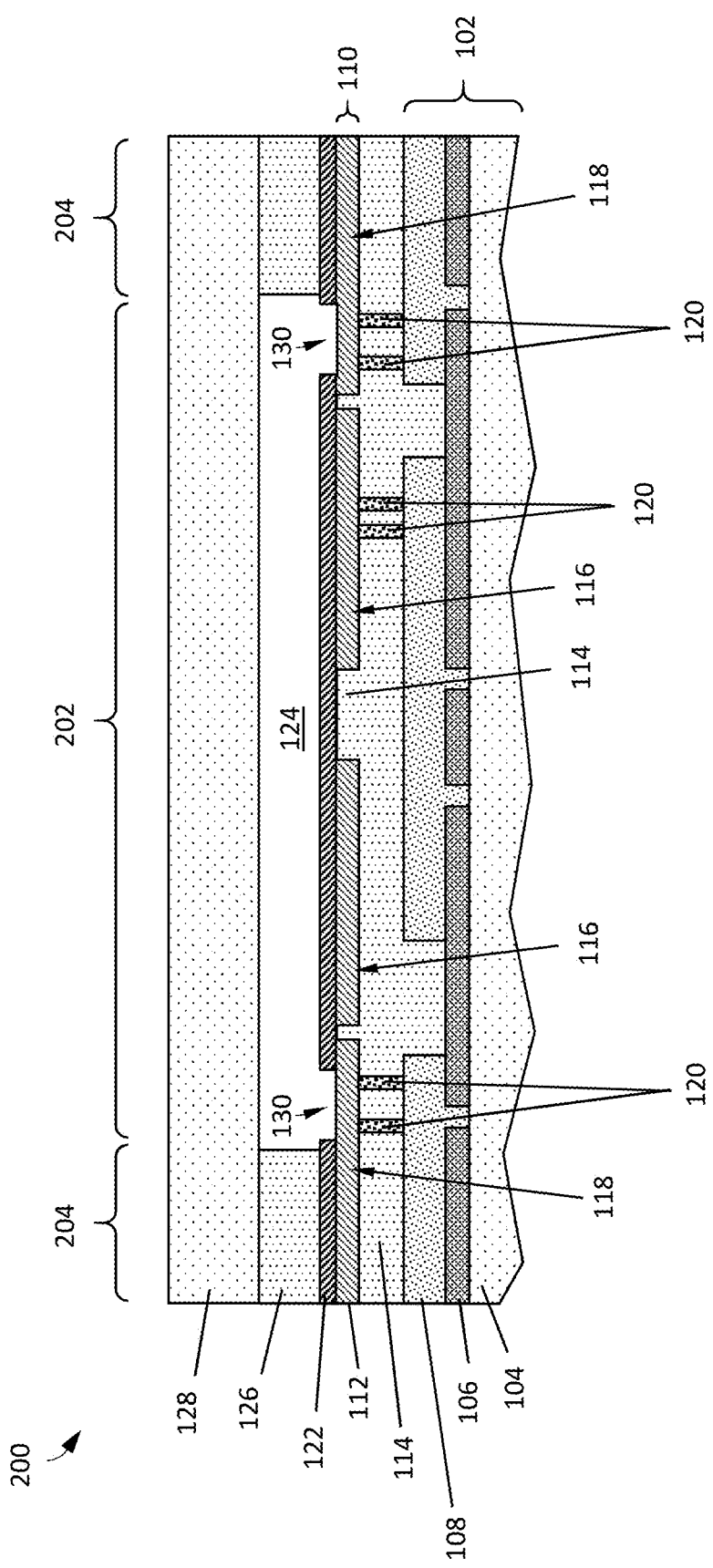
FIG. 2 is a cross-sectional view of another exemplary micromachined ultrasonic transducer device.
Figures 1, 5:
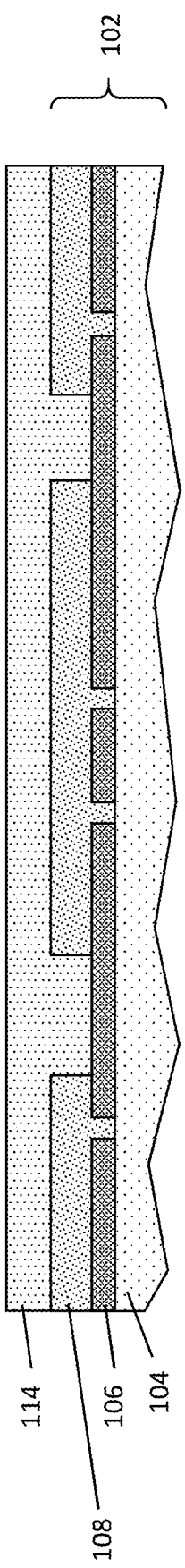
Figures 2, 5:
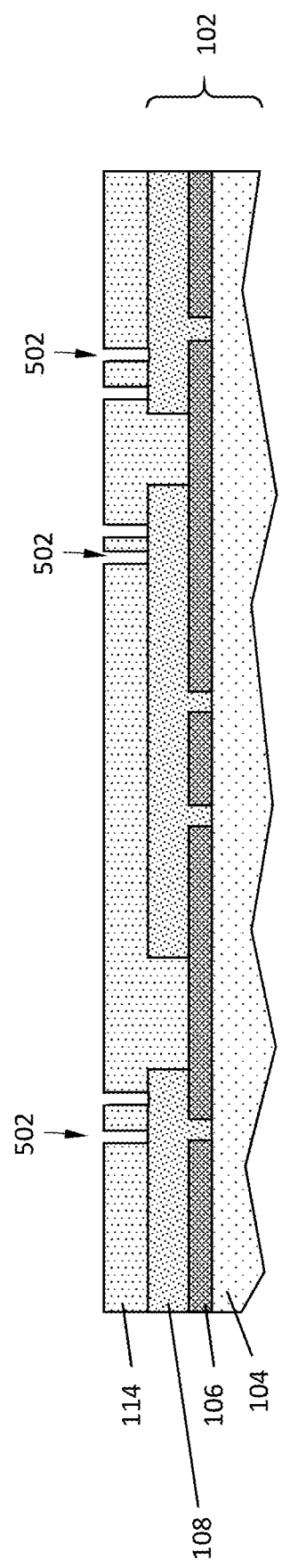
Figures 3, 5:
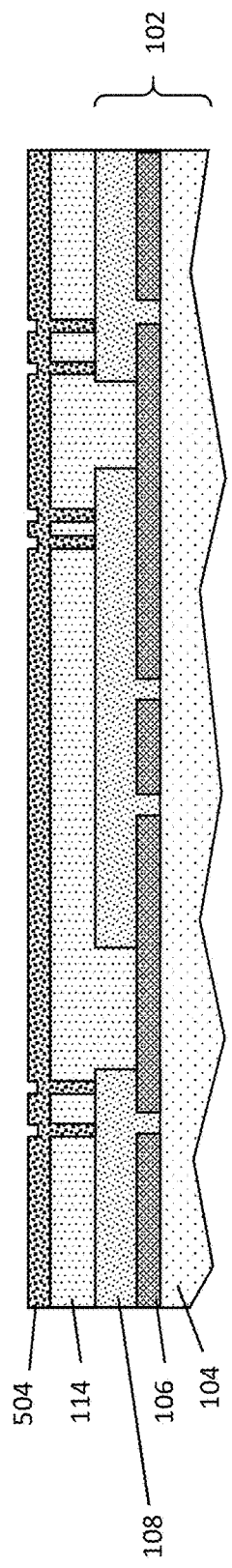
Figures 4, 5:
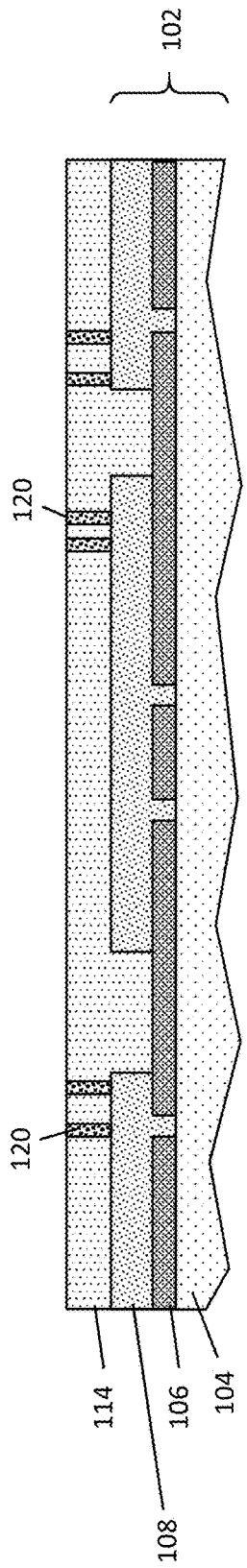
Figure 5:
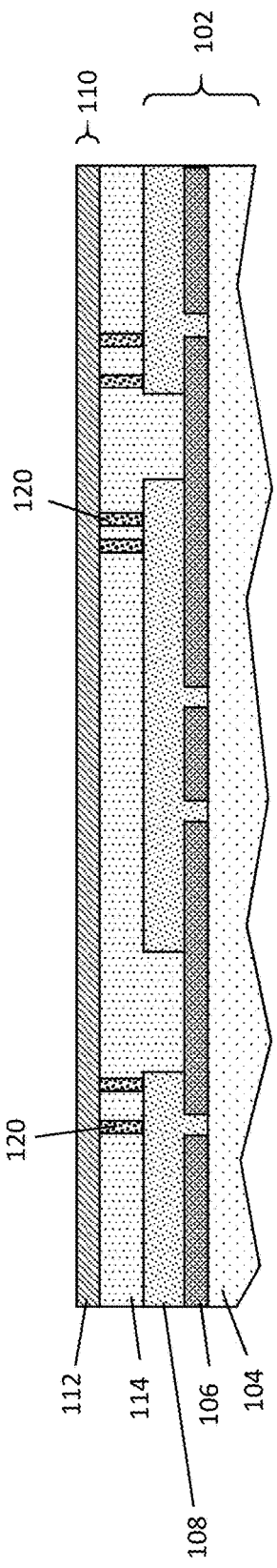

By way of further illustration, FIGS. 5-1 through 5-12 are a series of cross-sectional views illustrating a process that may be used to form the transducer device 200 of FIG. 2, including both the aforementioned getter opening structures and the via-below-cavity structures. FIG. 5-1 illustrates the CMOS substrate 102 having insulation layer 114 formed thereon. In FIG. 5-2, via openings 502 are patterned into the insulation layer 114 using, for example a patterned photoresist material (not shown) followed by etching to access the one or more wiring redistribution layers 108. Then, as shown in FIG. 5-3, a fill material metal layer 504 such as W, for example, is formed over the patterned insulation layer 114 and via openings 502. This is followed by a planarizing operation, such chemical mechanical polishing (CMP) for example, to remove excess fill material of the metal layer 504 to the top surface of the insulation layer 114, thereby defining the vias 120 as shown in FIG. 5-4.

Figures 5, 6:
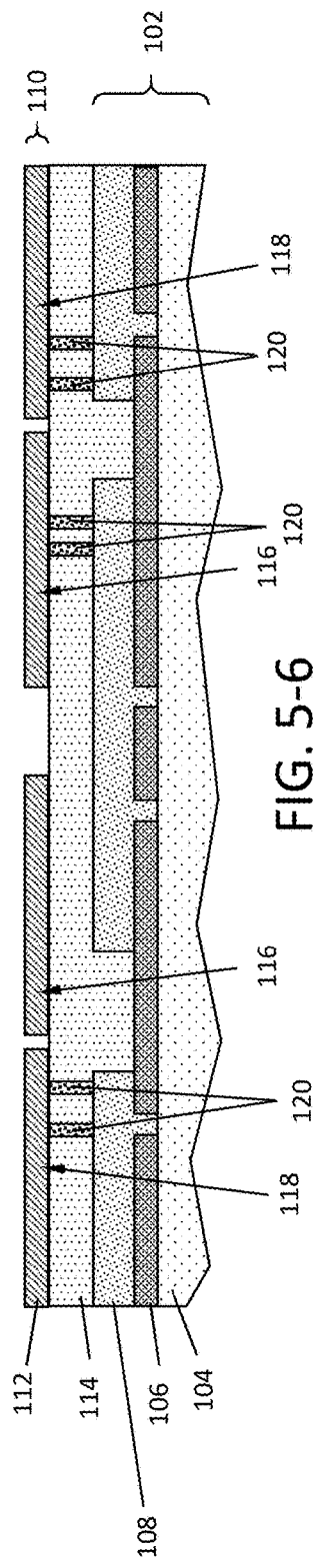
Figures 5, 6, 7:
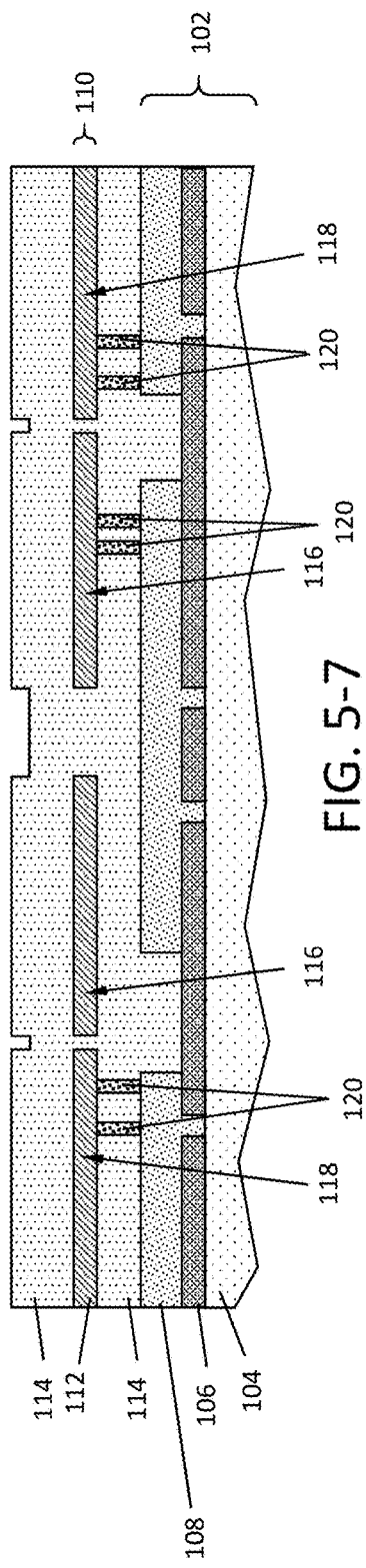
Figures 5, 6, 7, 8:
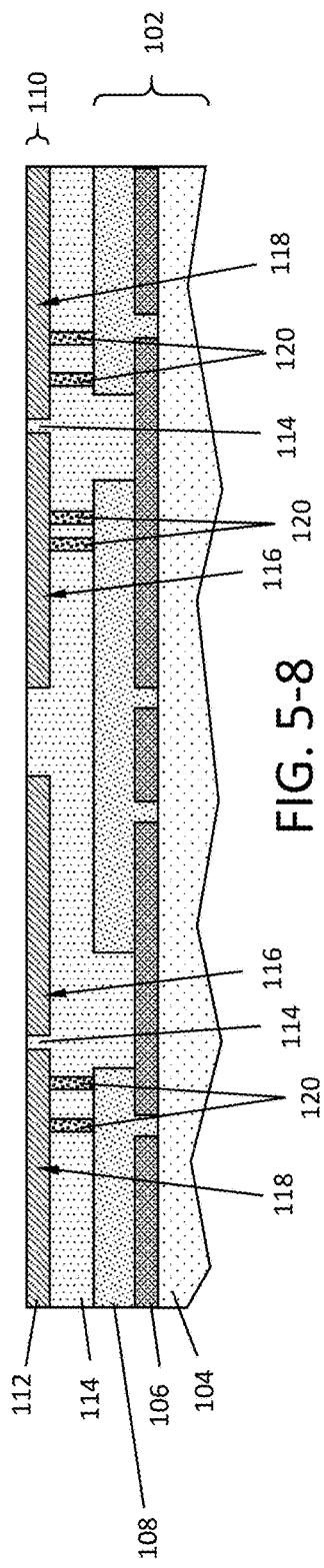

In FIG. 5-5, the metal layer 112 (e.g., Ti) defining the bottom electrode layer 110 is deposited. The metal layer 112 is patterned as shown in FIG. 5-6 (such as by photoresist patterning and etching) to define the aforementioned transducer electrode and bypass metal structures 116, 118, respectively. This is followed by deposition of additional oxide material fill (e.g., the same as insulation layer 114) as shown in FIG. 5-7 and oxide planarizing to the metal layer 112 as shown in FIG. 5-8. Then, in FIG. 5-9, the membrane support layer 126 is formed, followed by etching of the transducer cavity 124 in FIG. 5-10. As shown in FIG. 5-11, the aforementioned getter opening pattern 130 is etched into the bottom cavity layer 122 to expose a portion of the bypass metal structures 118, after which the transducer cavity 124 may then be sealed by bonding a transducer membrane 128 to the membrane support layer 126. Such a bonding operation may be, for example, a low temperature oxide-to-oxide fusion bonding process in which the transducer membrane 128 is bonded to the membrane support layer 126 at about room temperature and thereafter annealed at a temperature below about 450° C.

The getter opening pattern 130 shown in FIG. 5-11 represents a desired case where the etch process ends once the bypass metal structures 118 are exposed and will serve as a getter material. However, as illustrated in FIG. 5-12, it is possible that some over etching could occur such that some thickness of the bypass metal structures 118 is also unintentionally removed as well. This is represented in FIG. 5-12 by getter opening pattern 130'. Consequently, a getter opening process (e.g., dry etching) may have the potential for electrical conductivity degradation of the bypass capacitor (118) if there is over etching of the bypass metal material. Moreover, any metal loss from over etching can have a more pronounced impact on an embodiment such as shown in FIG. 2, since the majority of the vias connecting to the bypass metal structures 118 are located directly below the getter opening pattern 130', as will be recalled from an inspection of FIG. 4. To further illustrate, FIG. 6 depicts a similar view to that of FIG. 4, but with the added view of illustrating the bottom cavity layer 122 (dark regions) and the annular getter opening pattern 130' (light regions) etched into the bottom cavity layer 122. As can be seen, the annular getter opening pattern 130' exposes a portion of the bypass metal that directly overlies the vias 120. Thus, in a situation where there is significant bypass metal loss from over-etching, this may result in poor electrical conductivity between the vias 120 (e.g., W) and the bypass capacitor electrode metal 118 (e.g., Ti).

Even in the event where no substantial over etching of the getter opening pattern occurs, the gettering process itself might also induce some amount of Ti film loss by virtue of how the gettering process works (e.g., the getter metal absorbs different gas species inside the CMUT cavity, thereby converting the top surface of the getter metal film will turn into a metal oxide. For example, in the case of a Ti getter metal, a getter byproduct may be the formation of Ti oxide at a thickness of about 100 angstroms (Å). This oxidation can also reduce the electrical conductivity so long as the getter location overlaps with the underneath electrical connection vias, such as in FIG. 6.

Accordingly, FIG. 7 illustrates an alternative getter opening pattern 730, in accordance with an exemplary embodiment. As will be noted, instead of a completely annular pattern, the pattern 730 in FIG. 7 is segmented in a manner such that significantly reduces or minimizes the amount of vias 120 that are located directly beneath the getter metal exposed by the getter opening pattern 730. In some cases there may be no vias directly below a given portion of the pattern 730, and in other cases there may be a few vias directly below a given portion of the pattern 730. In this manner, the getter opening process (e.g., etching) and/or the cavity gas getting process itself (e.g., oxidation) may have a minimal impact on via electrical conductivity. It should be noted that since the overall effective getter area in the embodiment of FIG. 7 is reduced with respect to that of FIG. 6, getter efficiency may be experimentally evaluated (e.g., by varying getter pattern sizes and/or locations) in order to determine a maximum acceptable getter area reduction that does not substantially affect the purpose of the gettering itself (i.e., to getter cavity gas species).

Figure 8A:
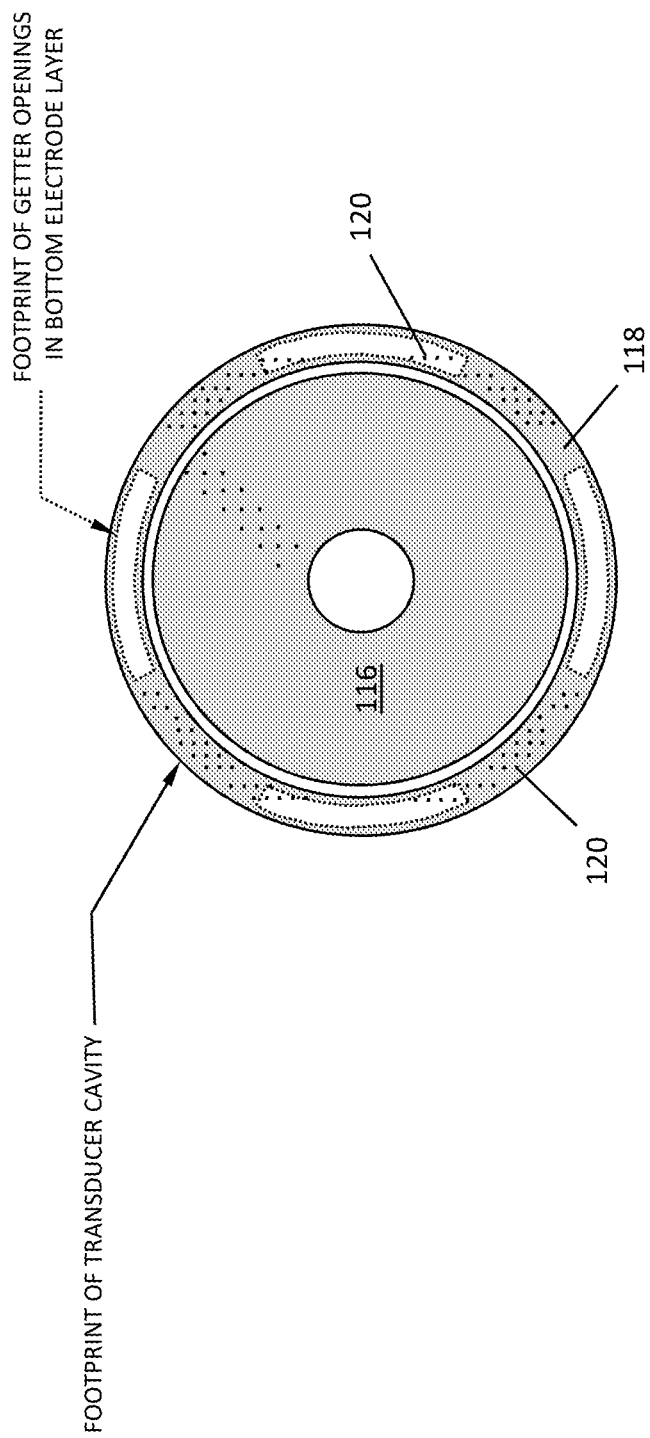
FIG. 8A is an enlarged plan view of one of the transducers of FIG. 4, in accordance with an embodiment.
Figure 8B:
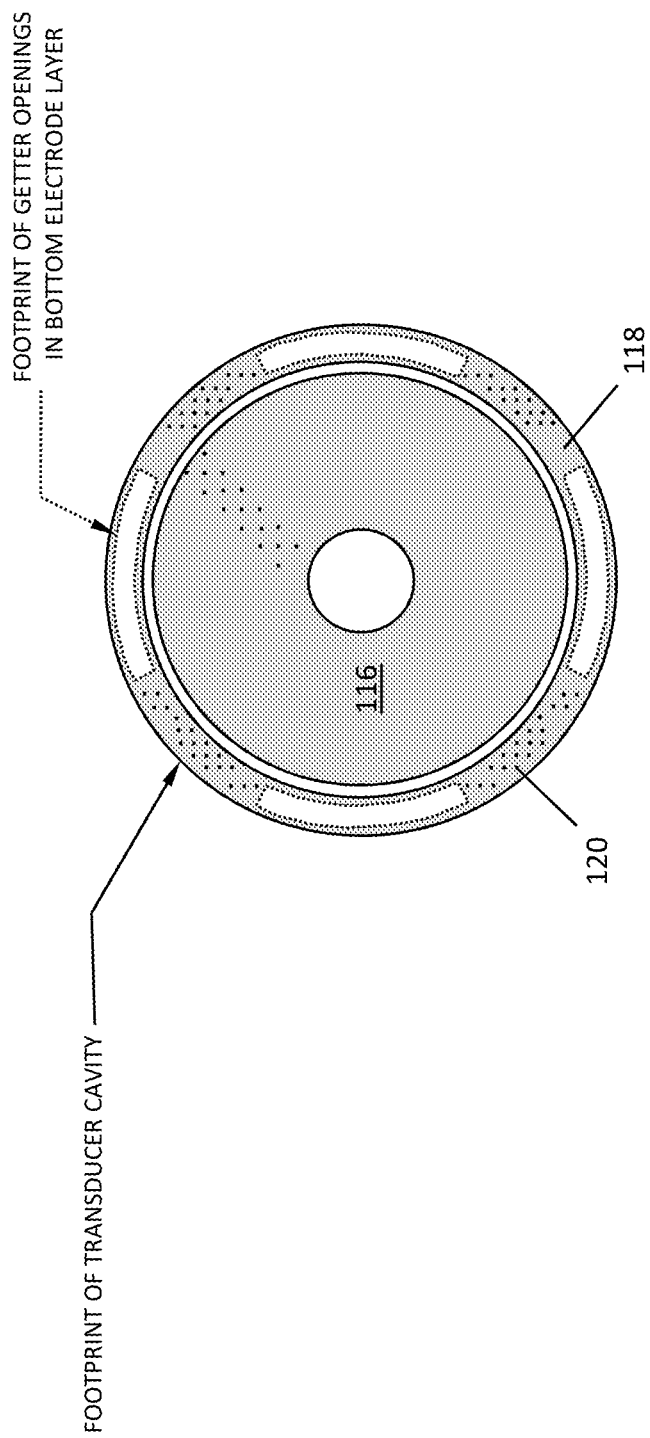
FIG. 8B is an enlarged plan view of one of the transducers of FIG. 4, in accordance with another embodiment.
Figure 9:
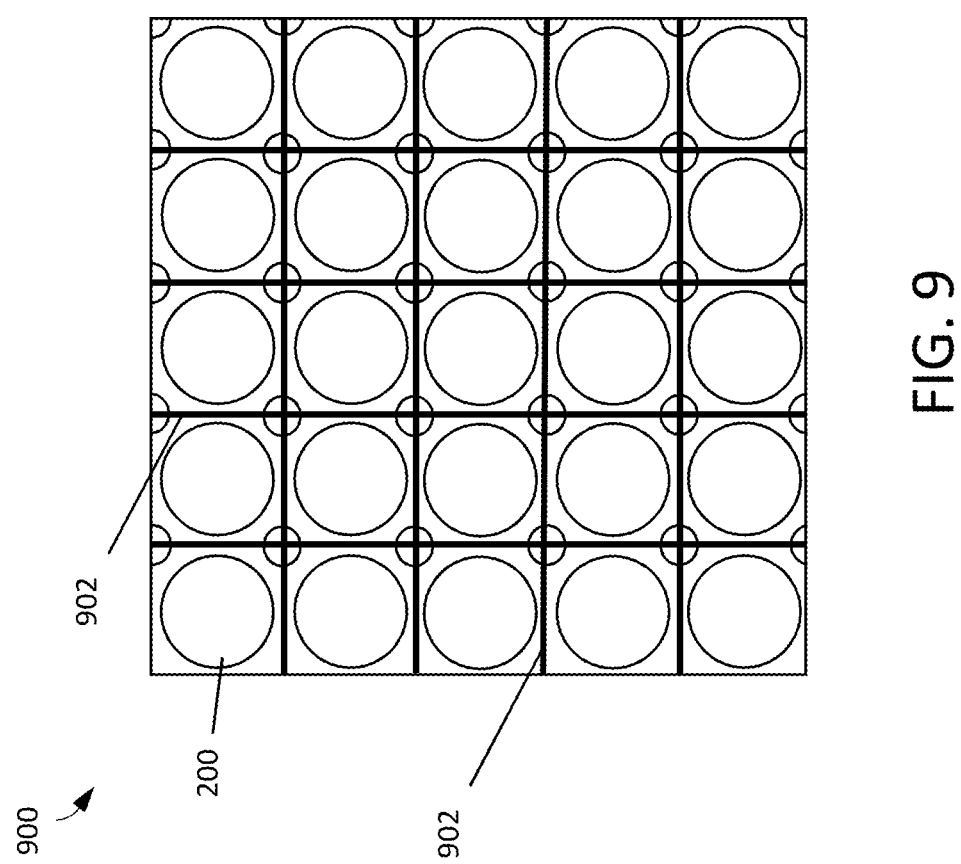
Figure 11:
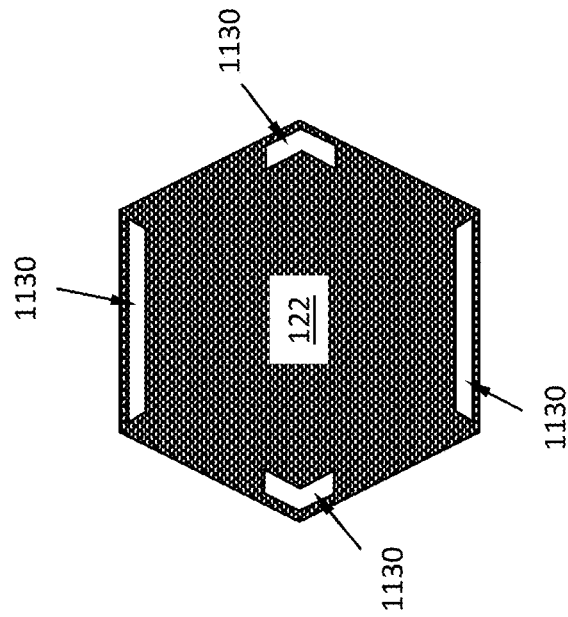
Figure 10:
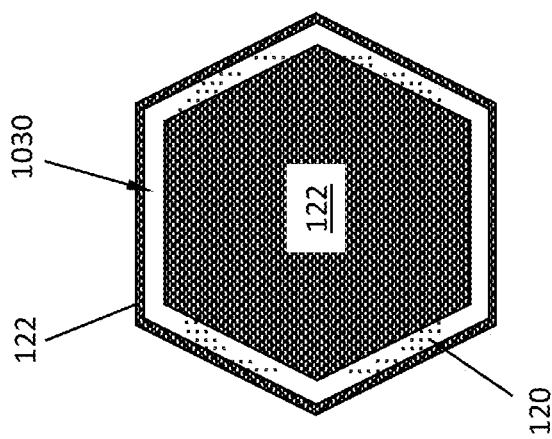

By way of further illustration, FIG. 8A is an enlarged view of one of the transducers of FIG. 4, which shows an example relationship between the transducer cavity "footprint" (outer circle) and the footprint of the segmented getter opening pattern (dashed pattern) of FIG. 7. As can be seen, the vias 120 that connect to both the transducer electrode 116 and the bypass metal structure 118 are directly below the transducer cavity footprint. Further, a majority of the vias 120 connecting to the bypass metal structure 118 are not directly below the segmented getter opening pattern, but are instead offset in other regions of the bypass metal structure 118. Alternatively, FIG. 8B illustrates an embodiment where none of the vias 120 contacting the bypass metal structure 118 are disposed directly below the segmented getter opening pattern, but instead are all displaced (offset) from being directly below the segmented getter opening pattern.

Figures 5, 6, 7, 8, 9:
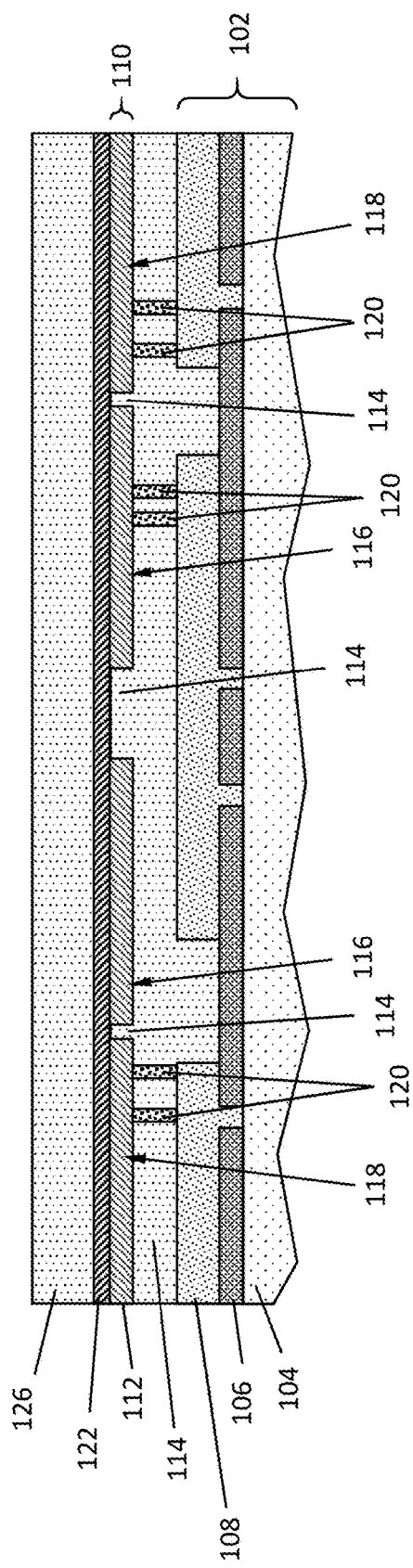

FIG. 9 illustrates a top view of an example ultrasonic transducer device 900 formed using any of the exemplary transducer structure embodiments described herein. As illustrated, the transducer device includes an array of individual transducers 200, such as those respectively described above in conjunction with FIG. 2 and FIG. 7. The specific number of transducers 200 shown in FIG. 9 should not be construed in any limiting sense, and may include any number suitable for a desired imaging application, which may be for example on the order of tens, hundreds, thousands, tens of thousands or more. FIG. 9 further illustrates an example location of metal 902 that may distribute an electrical signal to the membranes (upper electrodes) of the transducers 200.

It should also be appreciated that although the exemplary geometric structure of this portion of the ultrasonic transducer 200 is generally circular in shape, other configurations are also contemplated such as for example, rectangular, hexagonal, octagonal, and other multi-sided shapes, etc. Consequently, the resulting segmented getter opening pattern may have individual getter segments that generally correspond to the geometric shape of the transducer cavity.

Figures 5, 6, 7, 8, 9, 10:
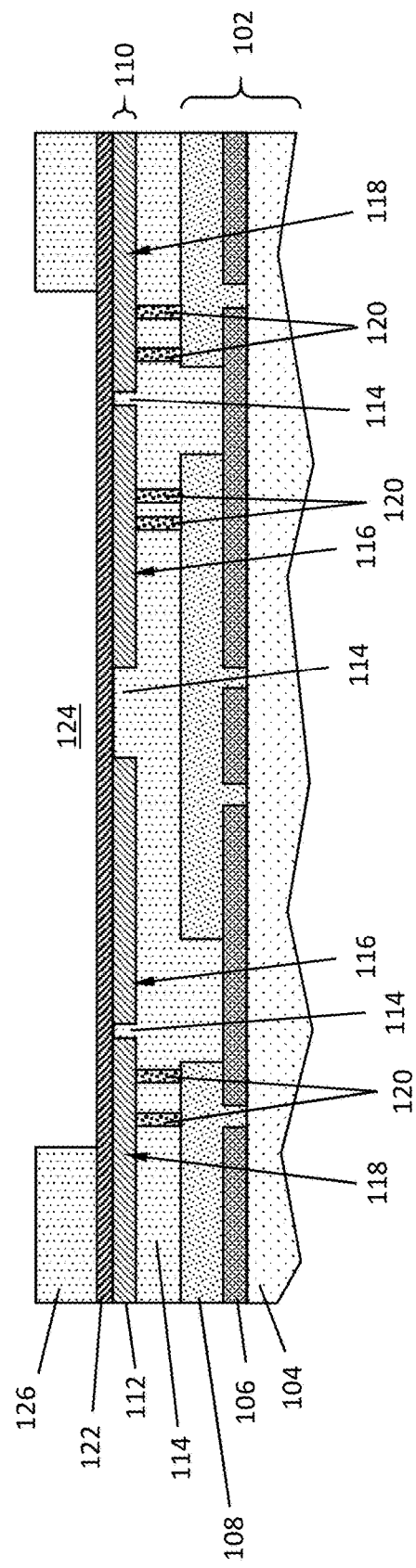
Figures 5, 6, 7, 8, 9, 10, 11:
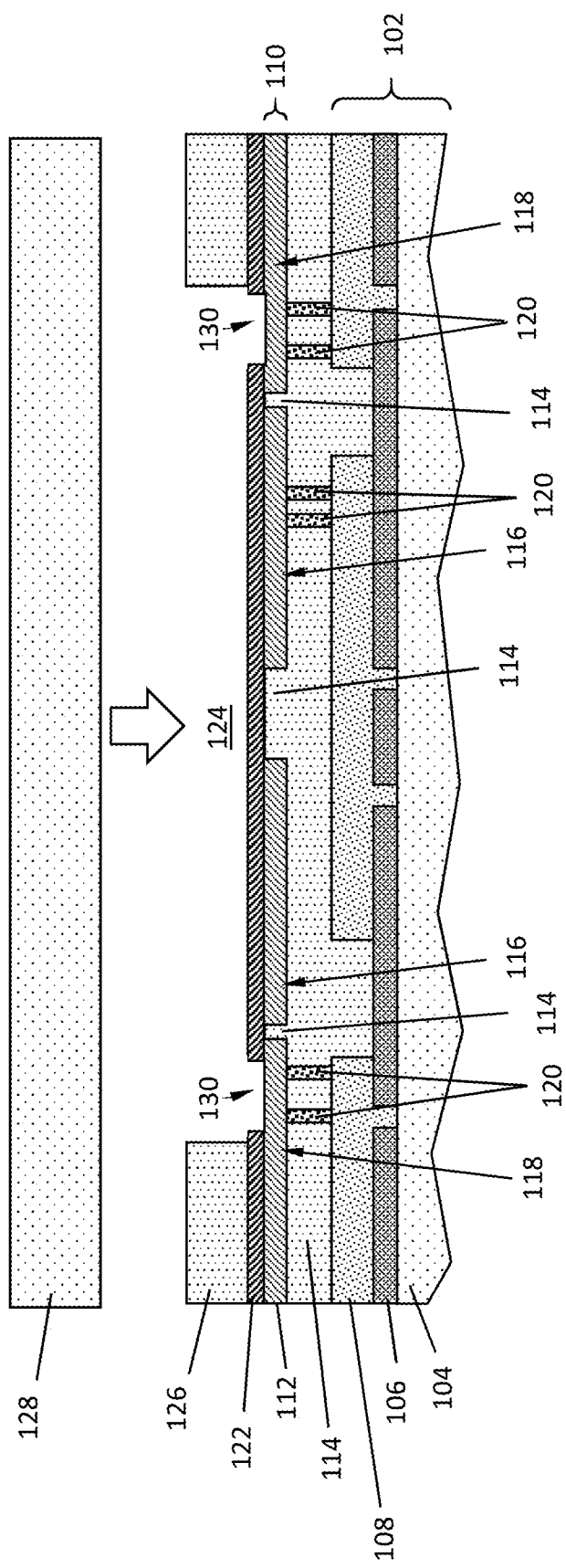
Figures 5, 6, 7, 8, 9, 10, 11, 12:
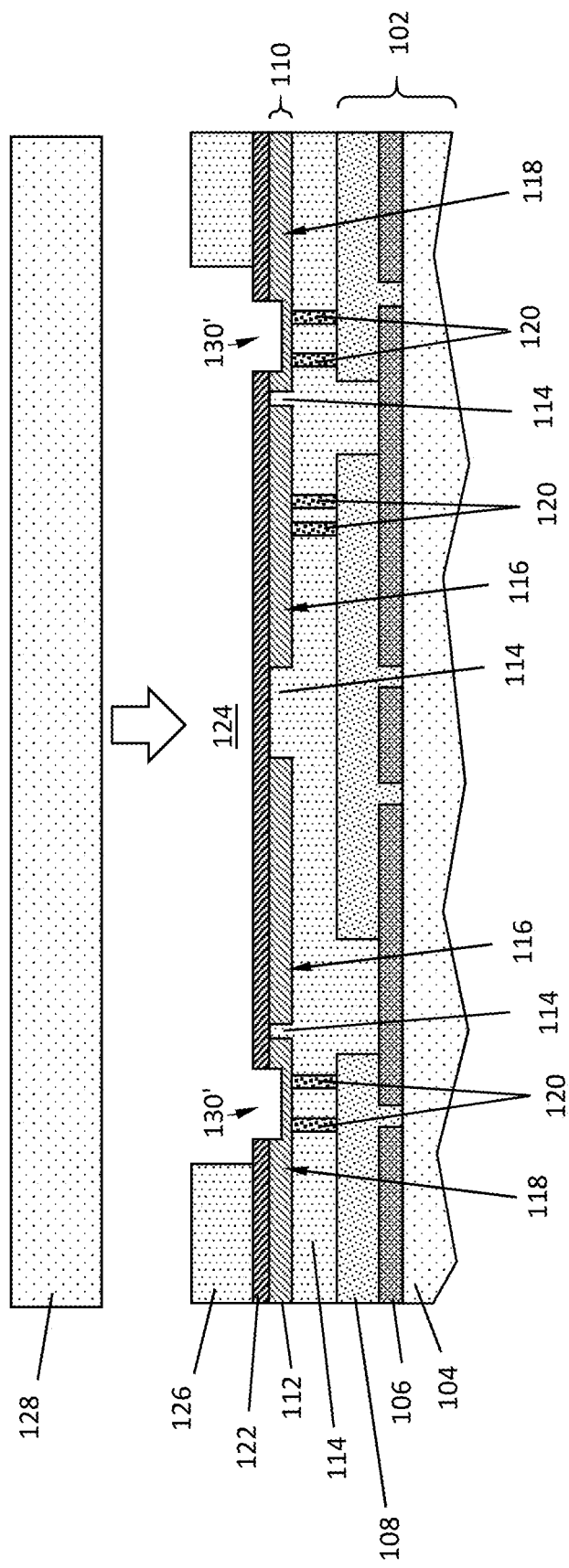
Figure 7:
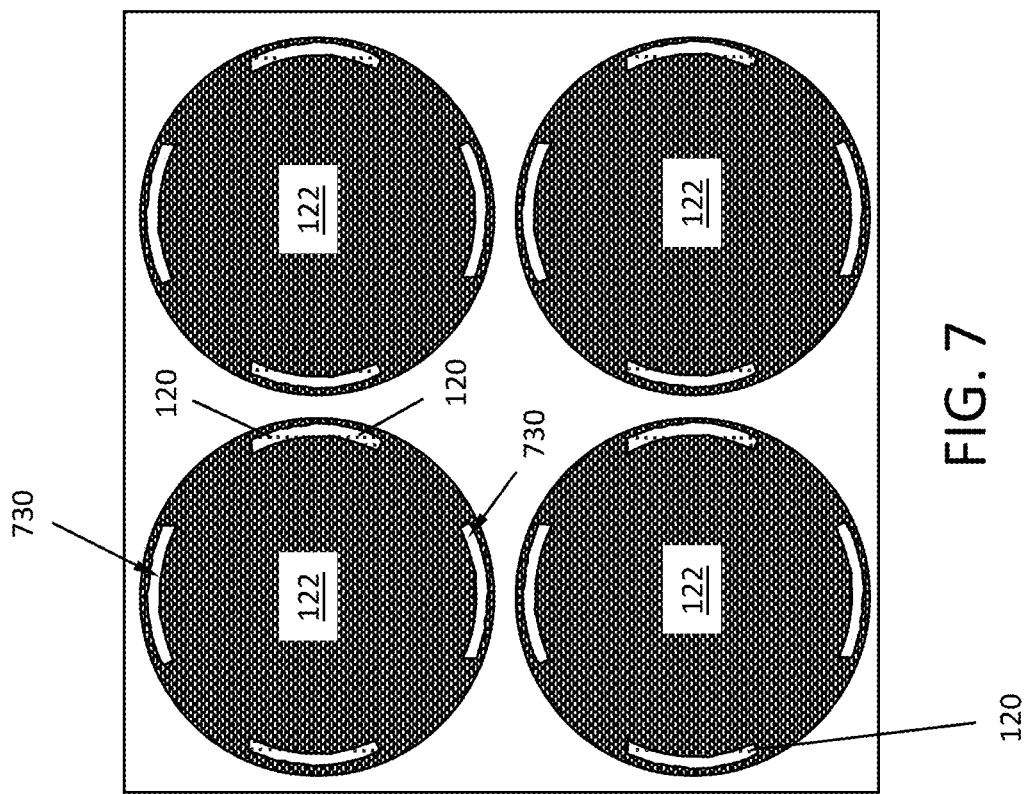
Figure 6:
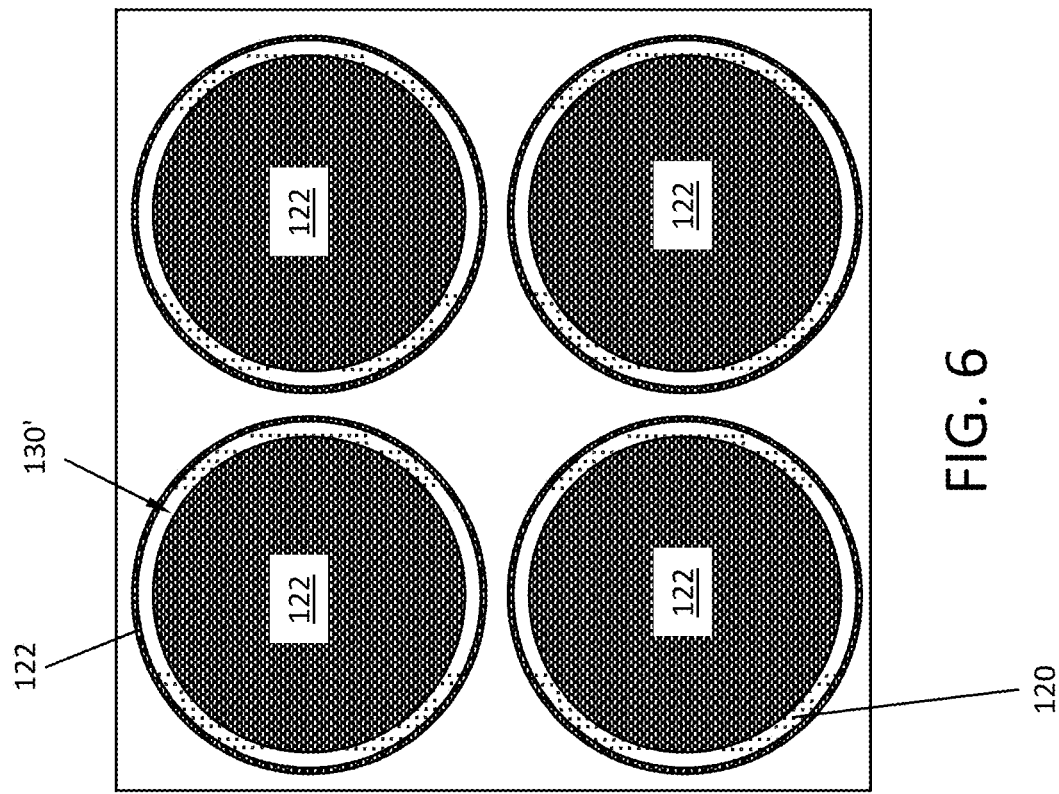

By way of one additional example, FIG. 10 and FIG. 11 illustrate a hexagonal shaped transducer cavity, and the differences between an annular shaped getter opening pattern and a segmented getter opening pattern. The getter opening pattern 1030 formed in the bottom cavity layer 122 of the embodiment of FIG. 10 is similar to that of the circular cavity configuration in FIG. 6, in that the pattern 1030 is continuous and extends adjacently around the entire perimeter of the hexagonal transducer. As is the case with FIG. 6, it will be seen that the annular getter opening pattern 1030 exposes a portion of the bypass metal that directly overlies the vias 120.

In contrast, the individual segments of the segmented getter opening pattern 1130 in FIG. 11 are advantageously located so as to expose bypass metal that avoids directly overlying most (if not all) of the vias beneath. It will be appreciated that there can also be a greater number or a lesser number of individual segments of the getter opening pattern 1130 in FIG. 11, and that each individual segment need not be identical to one another in shape and/or size.

As will thus be appreciated, the above described embodiments, whether implemented alone or in combination with one another, may provide certain benefits such as (for example) improved process margins and wafer bonding yield. As such, they may be particularly desirable for volume manufacturing of ultrasonic transducer devices and systems incorporating such devices.

The above-described embodiments can be implemented in any of numerous ways. For example, the embodiments may be implemented using hardware, software or a combination thereof. When implemented in software, the software code can be executed on any suitable processor (e.g., a microprocessor) or collection of processors, whether provided in a single computing device or distributed among multiple computing devices. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, some aspects of the technology may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

What is claimed is:

1. An ultrasonic transducer device, comprising:
a substrate;
a transducer cavity disposed over the substrate, wherein a bottom electrode layer of the transducer cavity is disposed over the substrate;
a plurality of vias that electrically connect the bottom electrode layer with the substrate;
a bottom cavity layer disposed over the bottom electrode layer; and
one or more openings formed in the bottom cavity layer so as to expose a region of the bottom electrode layer to the transducer cavity,
wherein a first portion of the bottom electrode layer comprises a transducer bottom electrode and a second portion of the bottom electrode layer comprises a bypass metal structure that is electrically isolated from the transducer bottom electrode,
a first portion of the plurality of vias connect to the bypass metal structure and are disposed in locations directly beneath a footprint of the transducer cavity in a plan view, and
a a second portion of the plurality of vias which has a larger number of vias than the first portion of the plurality of vias are not disposed directly beneath locations of the one or more openings in the plan view.

2. The ultrasonic transducer device of claim 1, further comprising a transducer membrane that seals the transducer cavity,
wherein the exposed region of the bottom electrode layer serves as a getter material to consume one or more gaseous materials present in the transducer cavity during bonding of the transducer membrane.

3. The ultrasonic transducer device of claim 2, wherein the bottom electrode layer comprises tungsten (W).

4. The ultrasonic transducer device of claim 3,
wherein the bottom cavity layer comprises an electrically insulating layer.

5. The ultrasonic transducer device of claim 3,
wherein the bottom cavity layer comprises a silicon oxide ($SiO_2$) and an aluminum oxide ($Al_2O_3$) layer.

6. The ultrasonic transducer device of claim 1,
wherein the one or more openings formed in the bottom cavity layer comprise segments that are disposed proximate an outer perimeter of the transducer cavity,
wherein the segments are configure to expose portions of the bypass metal structure.

7. The ultrasonic transducer device of claim 6,
wherein the segments are spaced apart from one another about the outer perimeter of the transducer cavity.

8. An ultrasonic transducer device, comprising:
a substrate;
a transducer cavity disposed over the substrate, wherein a bottom electrode layer of the transducer cavity is disposed over the substrate;
a plurality of vias that electrically connect the bottom electrode layer with the substrate;
a bottom cavity layer disposed over the bottom electrode layer; and
one or more openings formed in the bottom cavity layer so as to expose a region of the bottom electrode layer to the transducer cavity;
wherein the plurality of vias are disposed in locations beneath a footprint of the transducer cavity in a plan view, the locations also being offset from directly beneath a footprint of the one or more opening in the plan view.

9. An ultrasonic transducer device, comprising:
a substrate;
a transducer cavity disposed over the substrate, wherein a bottom electrode layer of the transducer cavity is disposed over the substrate, and
wherein the bottom electrode layer comprises:
a first portion that serves as a bypass metal structure that is electrionally isolated from the transducer bottom electrode;
a bottom cavity layer disposed over the bottom electrode layer;
a plurality of openings formed in the bottom cavity layer so as to expose regions of the bypass metal structure, the plurality of openings comprising segments disposed proximate an outer perimeter of the transducer cavity, and the segments being spaced apart from one another about the outer perimeter of the transducer cavity; and
a transducer membrane that seals the transducer cavity,
wherein the exposed regions of the bypass metal structure serve as a getter material to consume one or more gaseous materials present in the transducer cavity during bonding of the transducer membrane.

* * * * *